United States Patent [19]
Suzuki

[11] Patent Number: 6,104,879
[45] Date of Patent: Aug. 15, 2000

[54] SIGNAL FORMING APPARATUS

[75] Inventor: Satoshi Suzuki, Tokyo, Japan

[73] Assignee: Canon Kabushiki Kaisha, Tokyo, Japan

[21] Appl. No.: 09/236,584

[22] Filed: Jan. 26, 1999

[30] Foreign Application Priority Data

Jan. 29, 1998 [JP] Japan .................................. 10-017142

[51] Int. Cl.[7] .................................................. G03B 13/36
[52] U.S. Cl. ............................................................ 396/109
[58] Field of Search ..................................... 396/109, 106; 356/3.1, 3.11, 3.12; 250/201.4

[56] References Cited

U.S. PATENT DOCUMENTS 4,843,415  6/1989  Matsui et al. ........................... 396/109

FOREIGN PATENT DOCUMENTS 5-022843  1/1993  Japan .
9-042955  2/1997  Japan .

Primary Examiner—W. B. Perkey
Attorney, Agent, or Firm—Fitzpatrick, Cella, Harper & Scinto

[57] ABSTRACT

A signal forming apparatus forms signals related to distances by projecting light patterns in a plurality of target directions and receiving reflected light resulting from the projected light patterns. The device includes a first light emitting part which projects a light pattern in a first target direction, and a second light emitting part which projects a light pattern which differs in shape from the light pattern of the first light emitting part in a second target direction different from the first target direction.

7 Claims, 6 Drawing Sheets

SIGNAL FORMING APPARATUS

BACKGROUND OF THE INVENTION

1. Field of the Invention

The present invention relates to a signal forming apparatus, a distance measuring device and an optical apparatus, and more particularly to a signal forming apparatus adapted for a distance measuring device for measuring a distance to a distance measuring object, a focusing device arranged to detect a state of focusing through an amount of defocus indicated by an auxiliary light reflected from a photo-taking object or the like.

2. Description of Related Art

Figure 4:
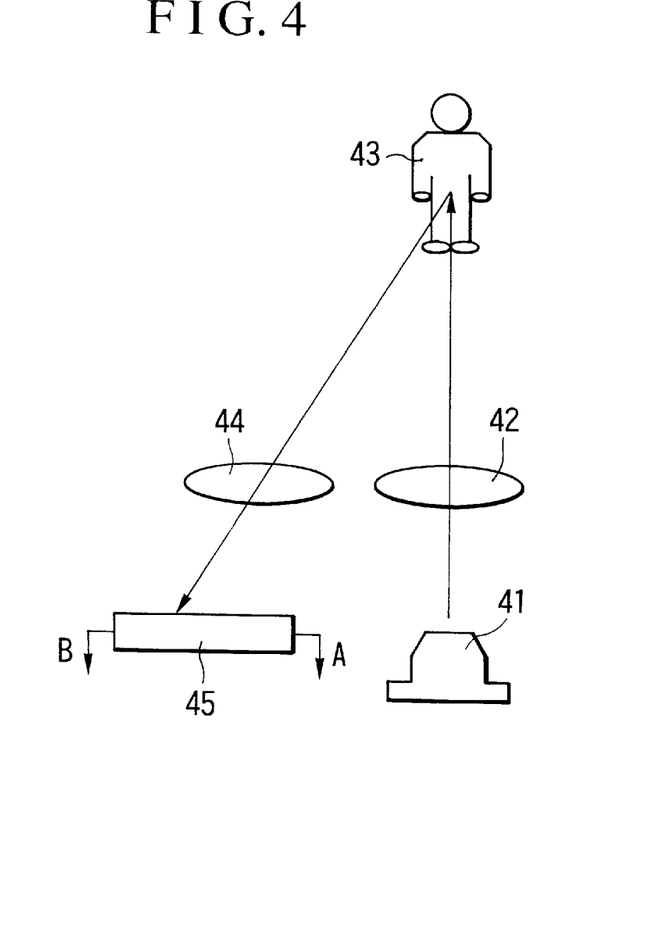
FIG. 4 is a schematic illustration showing the principle of measurement made by a conventional distance measuring device using a PSD.

Among distance measuring devices arranged to perform trigonometrical distance measurement by projecting a spot light onto a distance measuring object and receiving a reflected light from the distance measuring object, a device shown in FIG. 4 is popularly known. The device shown in FIG. 4 is arranged to project a spot light onto a distance measuring object 43 from an infrared light emitting diode 41 (hereinafter referred to as IRED) through a light projecting lens 42 and to receive at a position detecting element 45 (hereinafter referred to as PSD) a reflected light from the distance measuring object 43 through a light receiving lens 44. The PSD 45 is arranged to output, from its two terminals, signals A and B according to the position at which the reflected light is received. Therefore, the light receiving position of the PSD 45 can be detected by measuring these signals A and B, and then a distance to the distance measuring object 43 can be found through the light receiving position. The IRED 41 is set within the dome of a cover member which is formed in a dome-like shape.

However, the conventional distance measuring device shown in FIG. 4 has the following problems. In respect of S/N, for a feeble signal, noises generated by an amplifier of a signal processing circuit and by the resistance of the PSD 45 are added to every synchronous integral signal. Therefore, in order to obtain a signal component in a larger amount, it is necessary to increase the size of a distance measuring block which is composed of the light projecting lens 42, the light receiving lens 44, etc., and also to increase the light projecting power of the IRED 41 at the expense of possibility of reduction in size of the distance measuring device.

Further, it is necessary to increase the length of the PSD 45 for a wider distance measuring range. With the PSD 45 arranged to be longer for a wider distance measuring range, however, the varying rate of the signals A and B in relation to distances becomes smaller to deteriorate the accuracy of position detection.

Among the known distance measuring devices of the kind making trigonometrical distance measurement by projecting a spot light onto a distance measuring object and receiving a reflected light from the object, some of them are arranged to use a pair of sensor arrays as a light receiving element, to form an image of light reflected by the distance measuring object on each of the sensor arrays and to compute a distance to the distance measuring object by carrying out a correlative arithmetic operation to obtain a phase difference between the pair of images of reflected light received. Such an arrangement was disclosed, for example, in Japanese Patent Publication No. HEI 5-22843 and Japanese Laid-Open Patent Application No. HEI 9-42955. In the case of such a phase-difference detecting type distance measuring device, the so-called active AF (automatic focusing) method can be carried out to detect the light receiving position at a higher rate of resolution by virtue of the use of the multi-divided sensor array than in the case of carrying out the active AF method using the PSD. Besides, the active AF method using the multi-divided sensor array, such as a CCD or the like, has a better S/N than the active AF method using the PSD, because the active AF method using the multi-divided sensor array is almost completely unaffected by thermal noise caused by the resistance of an output part which becomes a dominant source of noise in the case of the active AF method using the PSD.

Figure 5:
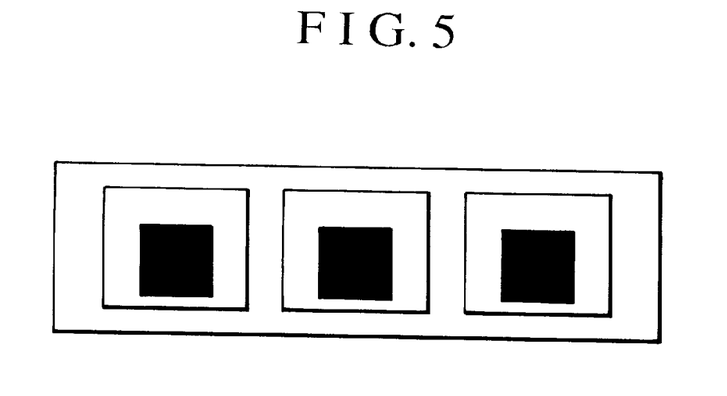
FIG. 5 shows the shape of light emitting parts of light projecting elements of an IRED shown in FIG. 4.

In the active AF method using the PSD, the AF action is performed with a distance computed by detecting the barycenter of the received light image. Therefore, the IRED used by this method can be arranged to have only one light emitting part at each light projecting element for one distance measuring point. FIG. 5 shows by way of example the pattern of light emission of an IRED adapted for multi-point distance measurement to be used by the active AF method using the PSD.

Referring to FIG. 5, the IRED having the light emitting pattern has three light projecting elements which respectively correspond to distance measuring points in three directions. One light emitting part is provided for each of the three light projecting elements which are arranged for distance measuring points in three directions.

According to the phase-difference detecting type active AF method, on the other hand, a plurality of light emitting parts are arranged for each of the light projecting elements of the IRED and the sensor arrays are arranged to output signals with many edges in a direction perpendicular to the pixel columns of the sensor arrays. It is known that the accuracy of the distance measurement increases accordingly as the number of these edges increases. FIGS. 6(a) to 6(c) and FIGS. 7(a) to 7(c) show the details of this method.

Figure 6A:
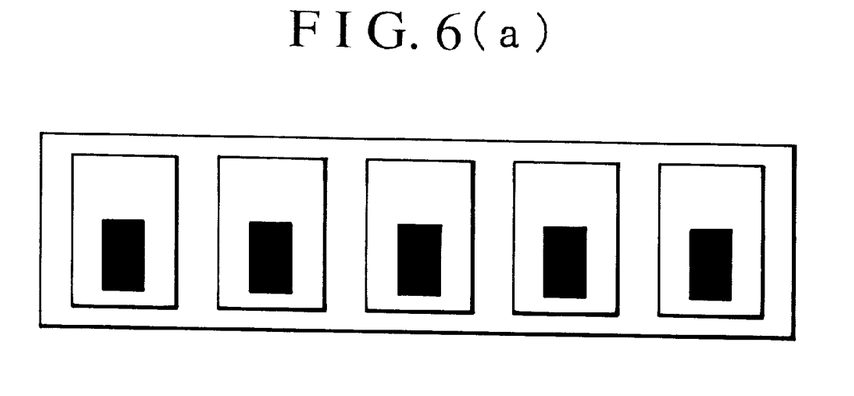
FIGS. 6(a) to 6(c) show an example of a conventional distance measuring arrangement, with FIG. 6(a) showing the shape of light emitting parts of light projecting elements, FIG. 6(b) showing an image of light received on the surface of a sensor array, and FIG. 6(c) showing a signal outputted from the sensor array.
Figure 7A:
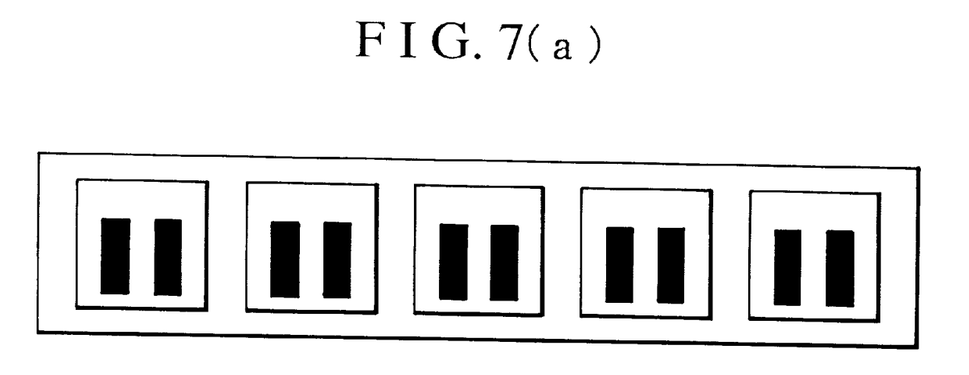
FIGS. 7(a) to 7(c) show another example of conventional distance measuring arrangement, with FIG. 7(a) showing the shape of light emitting parts of light projecting elements, FIG. 6(b) showing images of light received on the surface of a sensor array, and FIG. 6(c) showing a signal outputted from the sensor array.

FIGS. 6(a) and 7(a) show patterns of light emission of the IRED arranged for distance measuring points in five directions. FIG. 6(a) shows a case where one light emitting part of the vertically extending bar-like shape (shown in black) is provided for each light projecting element corresponding to one distance measuring point. FIG. 7(a) shows another case where two light emitting parts of the vertically extending bar-like shape (shown in black) are provided for each light projecting element corresponding to one distance measuring point.

Figure 6B:
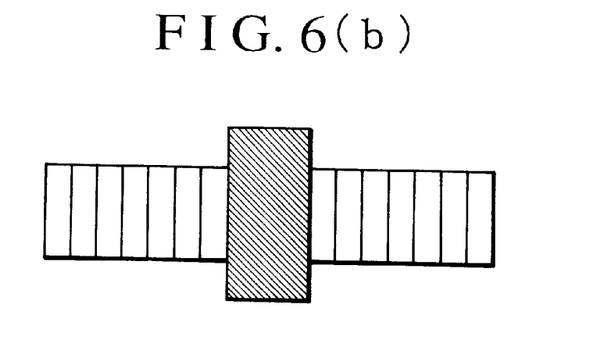
Figure 6C:
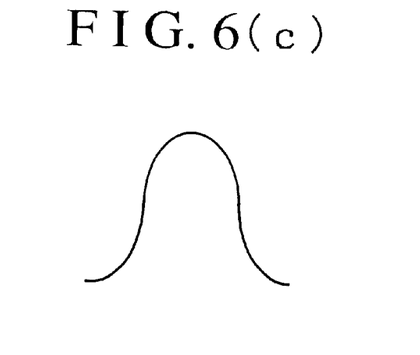
Figure 7B:
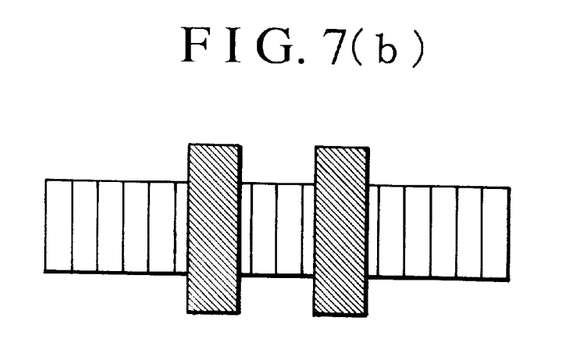
Figure 7C:
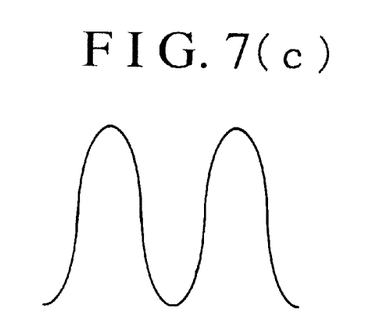

FIGS. 6(b) and 7(b) show images respectively formed by the light emission patterns of FIGS. 6(a) and 7(a) on each sensor array which corresponds to one distance measuring point. FIGS. 6(c) and 7(c) respectively show output signals of the sensor arrays to be used for correlative arithmetic operations by aligning the output values of the pixels of the sensor arrays. A difference between the output values of adjacent pixels increases at two parts, i.e., at the rise and fall of the output signal, as shown in FIG. 6(c). In the case of the output signal shown in FIG. 7(c), on the other hand, the difference between the output values of adjacent pixels increases at four parts. In carrying out the correlative arithmetic operation for detecting a phase difference, the larger the number of parts where the difference between the output values of adjacent pixel becomes large, the lesser the adverse effect of the state of reflected light or external noises on the distance measuring accuracy. Therefore, assuming that the light emission patterns shown in FIGS. 6(a) and 7(a) are obtained under the same conditions, such as the area of light emission, an IRED driving current, etc., distance measuring accuracy of a distance measuring device using the IRED of the light emission pattern of FIG. 7(a) is better than that of a distance measuring device using the IRED of the light emission pattern of FIG. 6(a). In view of this, many of the distance measuring devices of the above-stated phase-difference detecting type active AF method are arranged either to use an IRED having a plurality of light emitting parts at each light projecting element corresponding one distance measuring point or to use an IRED of the light emission pattern in which many edges are generated in the output signals of sensor arrays in the direction perpendicular to the column of pixels.

However, the conventional distance measuring devices of the phase-difference detecting type active AF method described above have the following problem.

As mentioned above, the larger the number of the bar-shaped light emitting parts of each light projecting element of the IRED, the better the accuracy of distance measurement. In actuality, however, the number of the bar-shaped light emitting parts is determined under various restrictions, as follows.

For example, since the size of the distance measuring device would increase if each light projecting element for one distance measuring point is arranged in one package (within a dome) separately from other light projecting elements, it is generally practiced to arrange the light projecting elements for all distance measuring points in one package. However, the total width of a chip forming the IRED is limited by the allowable size of the IRED package.

Further, in forming the light emitting parts for each light projecting element of the IRED, the rate of machining precision also imposes a limit on the extent to which the width of each bar-shaped light emitting part can be reduced. The feasible number of the bar-shaped light emitting parts is thus limited also by this limitation in addition to the limitation imposed on the total width of the chip.

BRIEF SUMMARY OF THE INVENTION

In accordance with one aspect of the invention, there is provided a signal forming apparatus which forms signals related to distances by projecting light patterns in a plurality of target directions and receiving reflected light resulting from the projected light patterns, the signal forming apparatus comprising a first light emitting part which projects a light pattern in a first target direction, and a second light emitting part which projects a light pattern which differs in shape from the light pattern of the first light emitting part in a second target direction different from the first target direction, so that the signals related to the distances in the plurality of target directions can be accurately obtained with a compact arrangement.

The above and other aspects of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

FIGS. 1(a) to 1(d) through FIG. 3 show the embodiment of the invention. The basic arrangement of the embodiment is first described with reference to FIG. 2.

Figure 2:
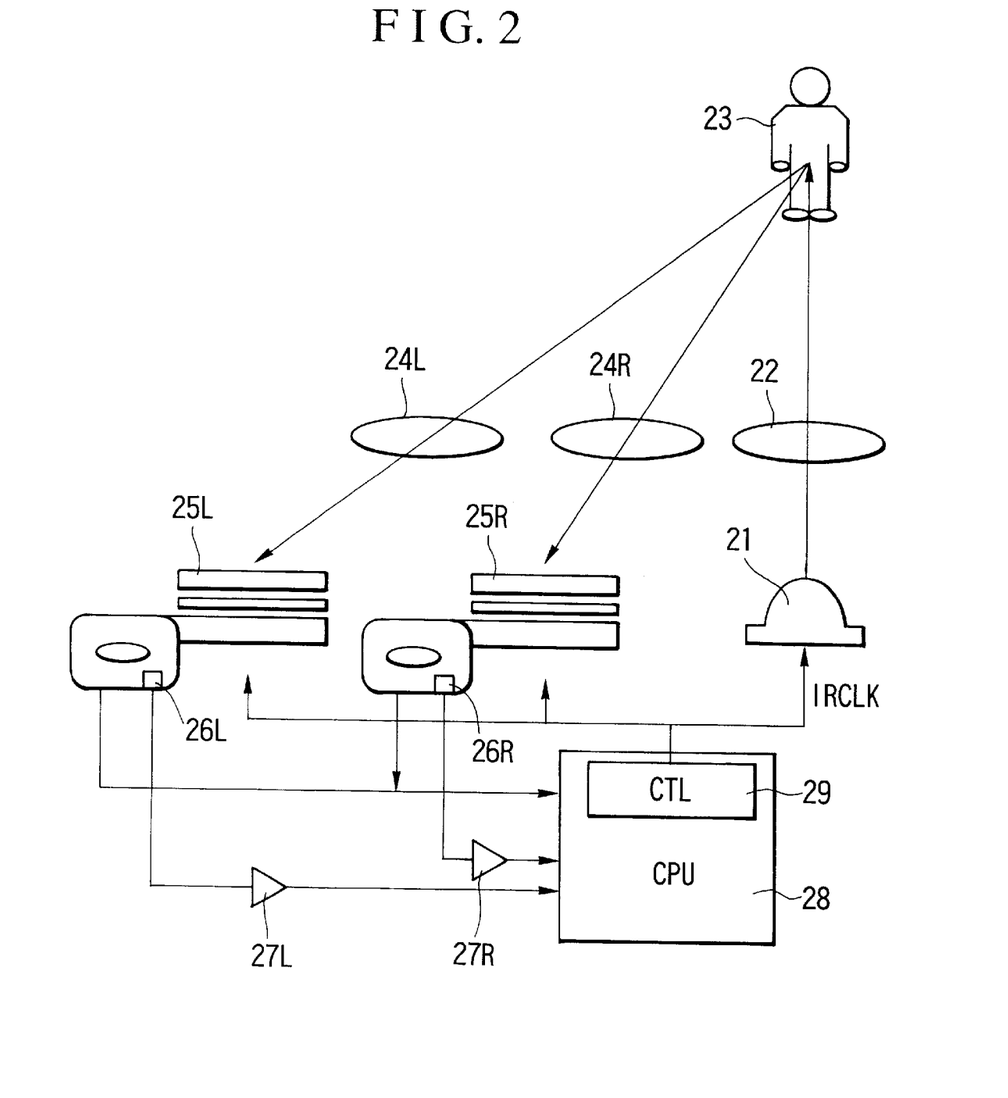
FIG. 2 is a schematic illustration showing the arrangement of the distance measuring device according to the embodiment of the invention.

Referring to FIG. 2, a control circuit 29 outputs a transfer clock signal IRCLK to light up an IRED 21 which has five light projecting elements disposed within a dome as a light projecting package. Then, light is projected from the IRED 21 onto a distance measuring object 23 through a light projection lens 22. The projected light is reflected by the distance measuring object 23. The reflected light is imaged through light receiving lenses 24R and 24L on light receiving parts 25R and 25L.

Thus, with the IRED 21 lighted up, the images of received light are formed on the light receiving parts 25R and 25L. Then, the images of the received light and external light are converted into electric charge by means of a photo-electric conversion element. When the IRED 21 is not lighted up, external light alone impinges on the light receiving parts 25R and 25L to be converted into electric charge by the photo-electric conversion element. The electric charge is accumulated by coming round the parts where CCDs are connected in a ring-like shape at the light receiving parts 25R and 25L. When the amount of electric charge is found through a comparator (not shown) to have reached a level sufficient for distance measuring computation, the electric charge accumulated is discharged from floating gates 26R and 26L of an output amplifying part to a CPU 28 through output amplifiers 27R and 27L.

The CPU 28 is arranged to find an amount of electric charge resulting from the reflected light of the light projected from the IRED 21 by computing a difference between the amounts of electric charge of an electric charge signal transferred when the IRED 21 is lighted up and an electric charge signal transferred when the IRED 21 is not lighted up. In other words, a difference between a sum quantity of the reflected light and the external light and the quantity of the external light alone is obtained. A correlative arithmetic operation is performed on image data of the electric charge amount thus obtained to find a relation between positions of the two received light images to find how much distance one received light image must be moved with respect to the other received light image, in terms of a number of pixels, in order to make these images coincide with each other. Then, by using the principle of the trigonometric distance measurement, a distance to the distance measuring object 23 can be obtained from the result of the above-stated correlative arithmetic operation. A focusing lens is driven on the basis of the distance computed.

The shape of light emitting parts of the light projecting elements in the IRED of the distance measuring device, the received light images formed on sensor arrays and the output values of pixels of the sensor array of the distance measuring device are as described below with reference to FIGS. 1(a) to 1(d).

Figure 1A:
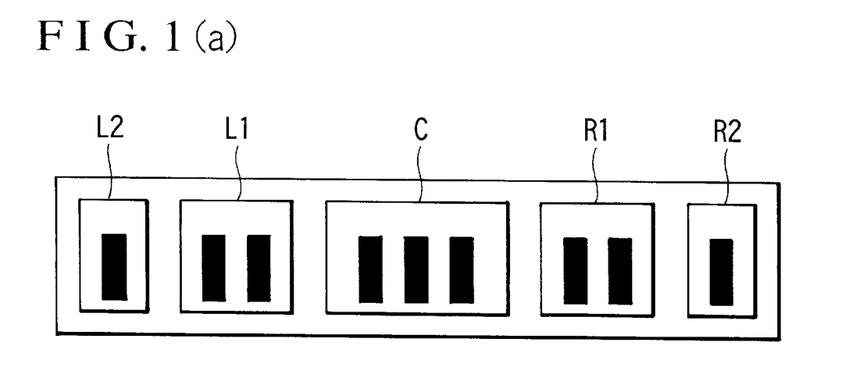
FIGS. 1(a) to 1(d) show an embodiment of the invention, with FIG. 1(a) showing the shape of light emitting parts of light projecting elements of a distance measuring device, FIG. 1(b) showing images of light received on the surface of a sensor array of the distance measuring device, FIG. 1(c) showing a signal outputted from the sensor array, and FIG. 1(d) being a sectional view showing the light emitting parts of the light projecting elements.
Figure 1B:
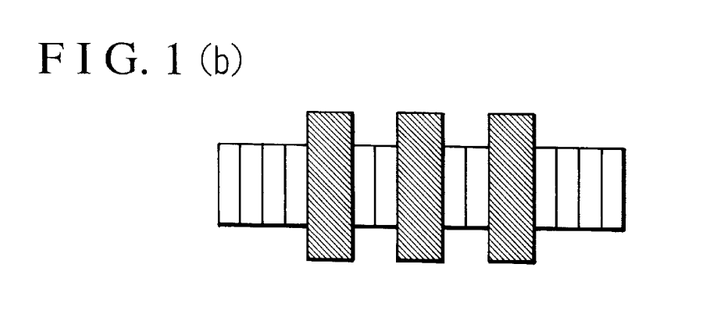
Figure 1C:
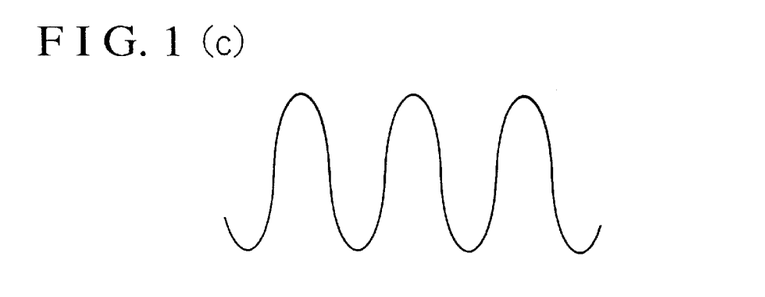
Figure 1D:
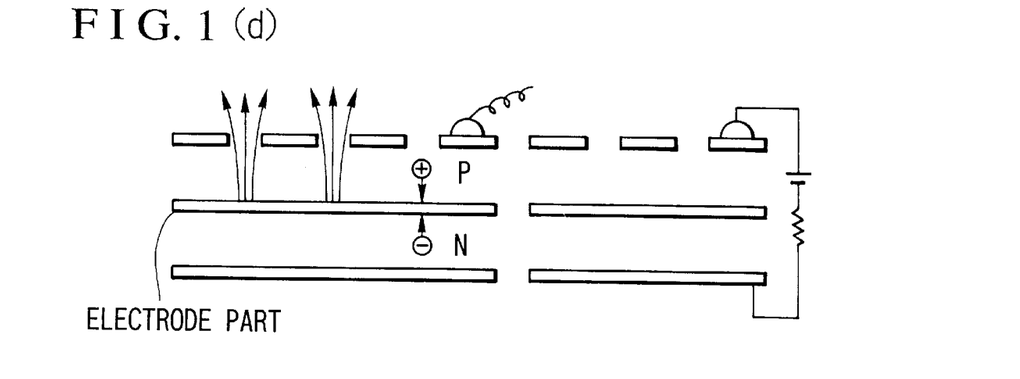

FIG. 1(a) shows the light emitting parts of light projecting elements used in the IRED of the distance measuring device. FIG. 1(d) is a sectional view of these parts of the IRED. The IRED (LED) is a crystal body having a PN junction. When a voltage is applied to the IRED as shown in FIG. 1(d), holes move from a P area to the PN junction to be recombined with electrons. Then, liberated energy becomes light. The light is projected through gaps between electrode parts. These gaps of the electrode parts then appear as if it is emitting light. These gap parts of the electrode parts present a vertically extending bar-like shape as shown in black in FIG. 1(a). The chip size is about the same as that of the conventional arrangement in which each of five distance measuring points has two bars as shown in FIG. 7(a). In the case of the embodiment, three bar-shaped light emitting parts are arranged at the light projecting element which corresponds to a central distance measuring point C. Each of distance measuring points R1 and L1 which are located adjacent to the central distance measuring point C and which is used when the focal length of the photo-taking lens is long is provided with two bar-shaped light emitting parts. Each of distance measuring points R2 and L2 which are located at two ends and which is used when the focal length of the photo-taking lens is short is provided with one bar-shaped light emitting part.

A driving current for driving the IRED is set in such a way as to have the luminance of light emission at each distance measuring point becomes equal to another distance measuring point by arranging the central light projecting element to have a larger current than the end light projecting elements. FIG. 1(b) shows the images of received light on the surface of the sensor array of the central distance measuring point C of the distance measuring device in the embodiment in which the light projecting elements have their light emitting parts arranged as shown in FIG. 1(a). The received light images are photo-electrically converted by the sensor array to form an output signal shown in FIG. 1(c).

In the output signal corresponding to the central distance measuring point C, the difference between output values of adjacent pixels becomes large at six parts. The distance measuring capability of the central distance measuring point C which has the six large-difference-having parts is higher than those of the distance measuring points R1 and L1 which respectively have four large-difference-having parts.

The output signal for each of the distance measuring points R2 and L2 has only two parts at which a difference between adjacent pixels becomes large. The distance measuring capability of the distance measuring points R2 and L2 is thus lower than that of distance measuring points R1 and L1. However, the distance measuring points R2 and L2 are provided for a shorter focal length of the photo-taking lens at which a hyper-focal distance is near and thus do not require the distance measuring capability as high as that of other distance measuring points. In view of this, the distance measuring points R2 and L2 are respectively arranged to have only one bar-shaped light emitting part to prevent the chip size from increasing by offsetting the larger number of bar-shaped light emitting parts arranged for the central distance measuring point C which is arranged to have three bar-shaped light emitting parts.

The operation of the distance measuring device arranged according to the embodiment as described above for a camera having a zoom function is next described in outline below with reference to FIG. 3 which is a flow chart showing a flow of operation of the CPU 28.

At a step S1, a distance measuring action is first performed for the central distance measuring point C. At a step S2, a check is made for a zoom position. If the zoom position is found to be on a telephoto side, the flow of operation proceeds to steps S3 and S4 to measure distances at the distance measuring points R1 and L1 one after another. If the zoom position is found to be on a wide-angle side, the flow proceeds to steps S5 and S6 to measure distances at the distance measuring points R2 and L2.

At a step S7, results of distance measurement for the last three distance measuring points are examined according to predetermined procedures to decide which of them is most reliable among others. Since the deciding processes are not directly related to the invention, the description of these processes is omitted here. It is decided to employ most reliable result.

Figure 3:
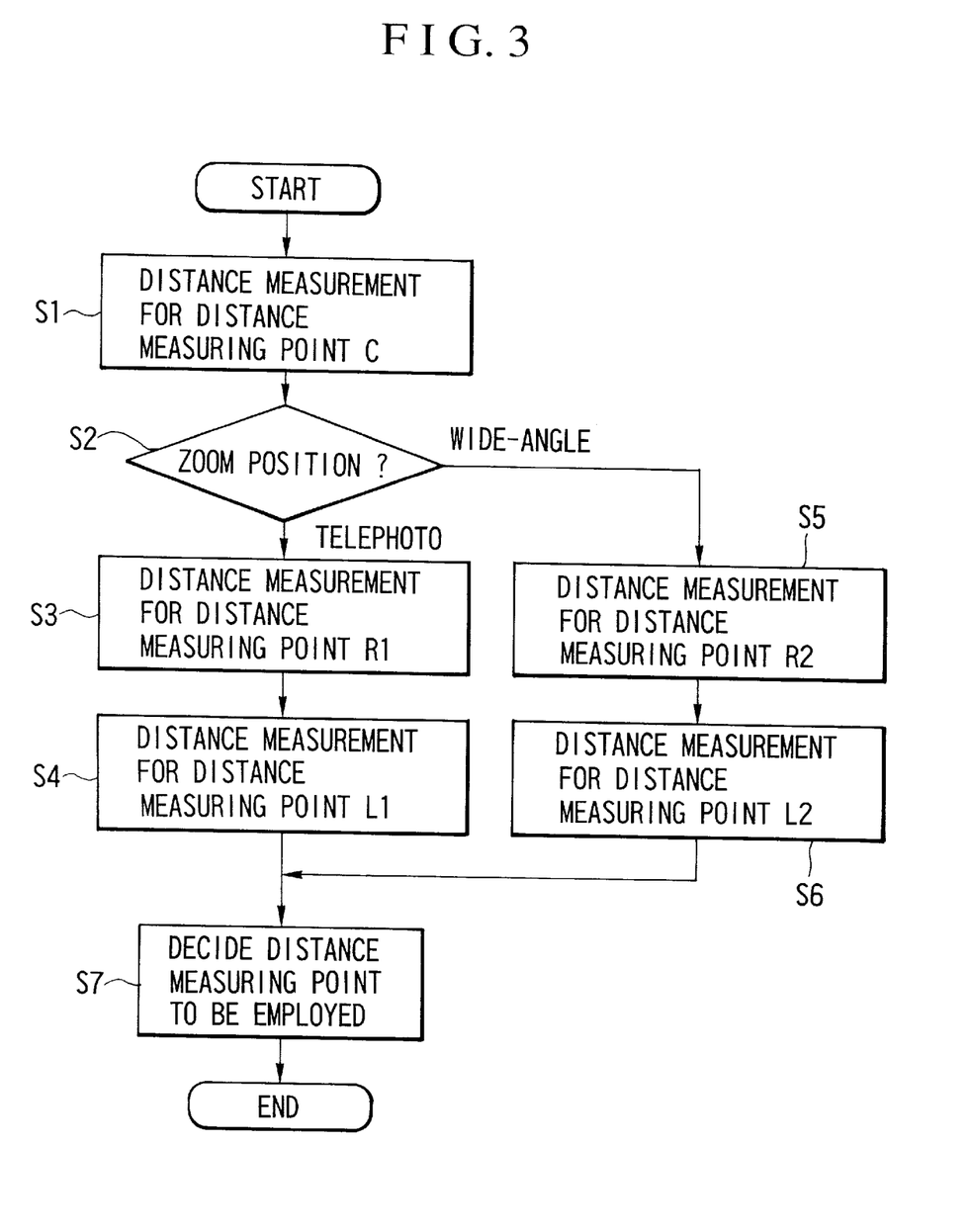
FIG. 3 is a flow chart showing an operation of the embodiment of the invention.

In the case of the flow chart of FIG. 3, the distance measuring device is arranged to always perform the distance measuring action for the three points. This arrangement, however, may be changed to adopt the result of distance measurement for the central distance measuring point without measuring distances for other points, if the result of distance measurement first made for the central distance measuring point is found to be reliable. As for the sequence of distance measurement, the distance measurement for the central distance measuring point does not have to be first performed before other points.

According to the arrangement of the embodiment, as described above, the distance measuring capability for the central distance measuring point is increased by arranging the central light projecting element to have three bar-shaped light emitting parts, and each of the light projecting elements for the distance measuring points of the widest visual field which are allowed to have a relatively low distance measuring capability is arranged to have only one bar-shaped light emitting part, so that the overall distance measuring capability of the distance measuring device can be enhanced without increasing the total chip size of the light projecting elements.

The individual components shown in schematic or block form in the drawings are all well known in the camera arts and their specific construction and operation are not critical to the operation or best mode for carrying out the invention.

While the invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the invention is applicable also to the following various cases.

(i) In an applicable case, the central light projecting element is arranged to have two bar-shaped light emitting parts, each of the light projecting elements on both sides of the central light emitting element to have two bar-shaped light emitting parts, and each of the light projecting elements on the outer sides to have one bar-shaped light emitting part. In another case, three light projecting elements are used, in which the central light projecting element is arranged to have two bar-shaped light emitting parts while each of the other light projecting elements located adjacent to the central light projecting element is arranged to have one bar-shaped light emitting part.

(ii) The embodiment is arranged to have three bar-shaped light emitting parts for the central distance measuring point for the purpose of enhancing the accuracy of distance measurement with importance attached to the central distance measuring point. However importance may be attached to a point other than the central distance measuring point.

(iii) The shape of the light emitting parts is not limited to the bar-like shape but may be in some other suitable shape. Such a modification may be made to give more latitude to the shape of light emitting parts by using a two-dimensional line sensor arrangement instead of the one-dimensional line sensor arrangement formed by parallel aligning a plurality of pixels in the direction of base length.

(iv) The invention is applicable not only to a camera but also to some other optical apparatus such as a binocular or the like.

(v) The invention is applicable also to an arrangement using auxiliary light for the passive type AF.

(vi) In the embodiment disclosed, the gaps of electrode parts of the IRED are used as light projecting parts. However, the invention is not limited to that arrangement, which may be replaced with some other suitable arrangement. For example, a mask or the like having slits formed therein is arranged as a light projecting part on the upper side of each light projecting element.

The invention may be carried out by combining, as necessary, technological elements of the embodiment described in the foregoing.

The invention applies to cases where either the whole or a part of the claims or the arrangement of each embodiment described forms one apparatus or is used in combination with some other apparatus or as a component element of an apparatus.

What is claimed is:

1. A signal forming apparatus which forms signals related to distances by projecting light patterns in a plurality of target directions and receiving reflected light resulting from the projected light patterns, said signal forming apparatus comprising:

(A) a first light emitting part which projects a light pattern in a first target direction; and (B) a second light emitting part which projects a light pattern in a second target direction different from the first target direction, wherein the number of edges of the light pattern of said first light emitting part is greater than the number of edges of the light pattern of said second light emitting part.

2. A signal forming apparatus according to claim 1, further comprising a light-receiving arithmetic unit which receives, through at least two optical paths, reflected light resulting from the projected light patterns in one of the target directions and which computes a signal related to a distance by performing an arithmetic operation on a correlation between images of the received light.

3. A signal forming apparatus according to claim 1, wherein said first light emitting part projects the light pattern in a central target direction, and said second light emitting part projects the light pattern in a target direction separated from the central target direction.

4. A signal forming apparatus according to claim 1, wherein said signal forming apparatus includes a camera.

5. A signal forming apparatus according to claim 4, wherein said signal forming apparatus includes an optical apparatus.

6. A light projecting device for a signal forming apparatus which forms signals related to distances by projecting light patterns in a plurality of target directions and receiving reflected light resulting from the projected light patterns, said light projecting device comprising:

(A) a first light emitting part which projects a light pattern in a first target direction; and (B) a second light emitting part which projects a light pattern in a second target direction different from the first target direction, wherein the number of edges of the light pattern of said first light emitting part is greater than the number of edges of the light pattern of said second light emitting part.

7. A signal forming apparatus which forms signals related to distances by projecting light patterns in a plurality of target directions and receiving reflected light resulting from the projected light patterns, said signal forming apparatus comprising:

a tip having a plurality of light emitting parts including first and second light emitting parts, said first light emitting part projecting a light pattern in a first target direction, and said second light emitting part projecting a light pattern, which differs in shape from the light pattern of said first light emitting part, in a second target direction different from the first target direction; and a single optical member through which light projected from all of said plurality of light emitting parts is passed.

* * * * *

UNITED STATES PATENT AND TRADEMARK OFFICE
CERTIFICATE OF CORRECTION

PATENT NO. : 6,104,879
DATED : August 15, 2000
INVENTOR(S) : Satoshi Suzuki

It is certified that error appears in the above-identified patent and that said Letters Patent is hereby corrected as shown below:

Column 1

Line 55, "of them" should be deleted.

Column 2

Line 60, "pixel" should read --pixels--.

Column 3

Line 6, "corresponding" should read --corresponding to--.

Column 4

Line 14, "conventional" should read --a conventional--.
    Line 17, "FIG. 6(b)" should read --FIG. 7(b)--.
    Line 18, "FIG. 6(c)" should read --FIG. 7(c)--.

UNITED STATES PATENT AND TRADEMARK OFFICE
CERTIFICATE OF CORRECTION

PATENT NO. : 6,104,879

DATED : August 15, 2000

INVENTOR(S) : Satoshi Suzuki

It is certified that error appears in the above-identified patent and that said Letters Patent is hereby corrected as shown below:

Column 5

Line 41, "becomes" should read --become--.

Column 7

Line 17, "However" should read --However,--.

Signed and Sealed this

Twenty-ninth Day of May, 2001

Attest:

NICHOLAS P. GODICI

Attesting Officer

Acting Director of the United States Patent and Trademark Office